(12) United States Patent
Ajisaka

(10) Patent No.: US 11,964,596 B2
(45) Date of Patent: Apr. 23, 2024

(54) VEHICLE SEAT AND VEHICLE

(71) Applicant: TOYOTA JIDOSHA KABUSHIKI KAISHA, Aichi-ken (JP)

(72) Inventor: Satoshi Ajisaka, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 491 days.

(21) Appl. No.: 17/233,549

(22) Filed: Apr. 19, 2021

(65) Prior Publication Data
US 2022/0001774 A1    Jan. 6, 2022

(30) Foreign Application Priority Data
Jul. 6, 2020   (JP) ................. 2020-116666

(51) Int. Cl.
*B60N 2/22* (2006.01)
*B60N 2/01* (2006.01)
*B60N 2/14* (2006.01)

(52) U.S. Cl.
CPC .............. *B60N 2/146* (2013.01); *B60N 2/01* (2013.01); *B60N 2/22* (2013.01)

(58) Field of Classification Search
CPC . B60N 2/005; B60N 2/02; B60N 2/14; B60N 2/146; B60N 2/22; B60N 2002/022
USPC ................................................. 296/64, 65.01
See application file for complete search history.

(56) References Cited

U.S. PATENT DOCUMENTS

| | | | | |
|---|---|---|---|---|
| 6,575,420 B2* | 6/2003 | Yoshida | ............... | B60N 2/14 |
| | | | | 297/344.22 |
| 6,938,957 B2* | 9/2005 | Beatty | ............... | B64D 11/0649 |
| | | | | 297/344.22 |
| 10,604,032 B2* | 3/2020 | Dry | ............... | B60R 16/037 |
| 11,001,169 B2* | 5/2021 | Jang | ............... | B60N 2/02246 |
| 11,208,012 B2* | 12/2021 | Hong | ............... | B60N 2/1635 |
| 11,505,040 B2* | 11/2022 | Nishio | ............... | B60R 11/0235 |
| 2020/0331327 A1 | 10/2020 | Nishio et al. | | |

FOREIGN PATENT DOCUMENTS

| | | | | |
|---|---|---|---|---|
| DE | 102012112529 B3 * | 3/2014 | ............ | B60N 2/015 |
| EP | 1367474 A2 * | 12/2003 | ............ | B60N 2/06 |
| JP | 2001-97081 A | 4/2001 | | |
| JP | 2015-150954 A | 8/2015 | | |
| JP | 2015-155215 A | 8/2015 | | |

(Continued)

*Primary Examiner* — Jason S Daniels
(74) *Attorney, Agent, or Firm* — HAUPTMAN HAM, LLP

(57) ABSTRACT

Provided is a vehicle seat including: a seat cushion supported by a support member so as to be rotatable around an axial direction along the seat up-down direction; a seatback configured such that the angle of the seatback relative to the seat cushion is adjustable by unlocking and locking of an angle adjustment mechanism, the seatback being biased to be tilted forward in the seat front-rear direction when the angle adjustment mechanism is unlocked; an operated member configured to unlock and lock the angle adjustment mechanism, the operated member being placed on a first end side of the seat cushion in the seat width direction; and an operating member provided in the support member such that the operating member is configured to relatively operate the operated member along with a rotation of the seat cushion so as to unlock the angle adjustment member.

8 Claims, 8 Drawing Sheets

(56) References Cited

FOREIGN PATENT DOCUMENTS

| JP | 2015150960 A | 8/2015 |
|----|--------------|--------|
| JP | 201879818 A  | 5/2018 |
| JP | 2018-127136 A | 8/2018 |
| JP | 2019-119347 A | 7/2019 |

* cited by examiner

VEHICLE SEAT AND VEHICLE

CROSS-REFERENCE TO RELATED APPLICATION

This application claims priority to Japanese Patent Application No. 2020-116666 filed on Jul. 6, 2020, incorporated herein by reference in its entirety.

BACKGROUND

1. Technical Field

The present disclosure relates to a vehicle seat and a vehicle.

2. Description of Related Art

A vehicle seat configured such that the rotation angle of a seat cushion is changeable by electric control has been known in the related art (e.g., see Japanese Unexamined Patent Application Publication No. 2018-079818 (JP 2018-079818 A)). In this vehicle seat, the angle of a seatback may be reduced by electric control before the rotation angle of the seat cushion is changed.

SUMMARY

However, in the case of the configuration where the angle of the seatback is reduced by electric control, it is necessary to provide, in the vehicle seat, a sensor configured to detect the angle of the seatback relative to the seat cushion, and an actuator configured to move the seatback. This increases the manufacturing cost of the vehicle seat, and the structure of the vehicle seat becomes complicated.

In view of this, an object of the present disclosure is to provide a vehicle seat that can rotate a seat cushion by reducing the angle of a seatback with a simple and inexpensive configuration, and a vehicle including the vehicle seat.

In order to achieve the above object, a vehicle seat according to a first aspect of the present disclosure is a vehicle seat including a seat cushion, a seatback, an operated member, and an operating member. The seat cushion is supported by a support member so as to be rotatable around an axial direction along the seat up-down direction. The seatback is configured such that the angle of the seatback relative to the seat cushion is adjustable by unlocking and locking of an angle adjustment mechanism, the seatback being biased to be tilted forward in the seat front-rear direction when the angle adjustment mechanism is unlocked. The operated member is configured to unlock and lock the angle adjustment mechanism, the operated member being placed on a first end side of the seat cushion in the seat width direction. The operating member is provided in the support member such that the operating member is placed on a first end side of the seat cushion in the seat width direction, the operating member being configured to relatively operate the operated member along with a rotation of the seat cushion so as to unlock the angle adjustment member.

In the disclosure according to the first aspect, when the seat cushion is rotated around the axial direction along the up-down direction, the operating member relatively operates the operated member along with the rotation of the seat cushion, so that the angle adjustment member in the seatback is unlocked. Hereby, the seatback is biased to be tilted forward in the seat front-rear direction, so that the seatback is avoided from interfering with an obstacle in a vehicle cabin when the seat cushion rotates. Thus, it is possible to rotate the seat cushion by reducing the angle of the seatback with a simple and inexpensive configuration.

Further, a vehicle seat according to a second aspect is configured as follows. That is, in the vehicle seat according to the first aspect, the seat cushion may be configured to be rotatable outwardly in the vehicle width direction.

In the disclosure according to the second aspect, the seat cushion is configured to be rotatable outwardly in the vehicle width direction. Accordingly, an occupant can get off a vehicle smoothly.

Further, a vehicle seat according to a third aspect is configured as follows. That is, the vehicle seat according to the first or second aspect may include a locking mechanism configured to cause the seat cushion to be non-rotatable. The locking mechanism may be configured to be unlocked when a select lever is set to a parking range.

In the disclosure according to the third aspect, the locking mechanism configured to cause the seat cushion to be non-rotatable is configured to be unlocked when the select lever is set to the parking range. Accordingly, it is possible to prevent such a situation that the seat cushion rotates and the seatback is tilted forward in the seat front-rear direction unnecessarily in such cases that the vehicle is traveling.

Further, a vehicle seat according to a fourth aspect is configured as follows. That is, in the vehicle seat according to the third aspect, the locking mechanism may be configured to be also unlocked when a self-driving mode is set.

In the disclosure according to the fourth aspect, the locking mechanism is configured to be also unlocked when the self-driving mode is set. That is, the seat cushion is rotatable only in either of a case where the select lever is set to the parking range and a case where self-driving is performed. Accordingly, it is possible to prevent such a situation that the seat cushion on a driver seat rotates by mistake and the seatback is tilted forward in the seat front-rear direction while the vehicle is manually operated, for example.

Further, a vehicle seat according to a fifth aspect is configured as follows. That is, in the vehicle seat according to the fourth aspect, the self-driving mode may include a plurality of levels. The locking mechanism may be configured to be unlocked when the self-driving mode is set to a predetermined level or more among the levels.

In the disclosure according to the fifth aspect, the locking mechanism is configured to be unlocked when the self-driving mode is set to the predetermined level or more among the levels. That is, the seat cushion is rotatable only in either of a case where the select lever is set to the parking range and a case where self-driving is performed at the predetermined level or more. Accordingly, it is possible to prevent such a situation that the seat cushion on the driver seat rotates by mistake and the seatback is tilted forward in the seat front-rear direction while the vehicle is manually operated or while self-driving is performed at a level less than the predetermined level.

Further, a vehicle seat according to a sixth aspect is configured as follows. That is, in the vehicle seat according to any one of the third to fifth aspects, the seat cushion may be configured to rotate in conjunction with unlocking of the locking mechanism by electric control.

In the disclosure according to the sixth aspect, the seat cushion is configured to rotate in conjunction with unlocking of the locking mechanism by electric control. Accordingly, in comparison with the case where the seat cushion is rotated manually, a burden to the occupant is reduced.

Further, a vehicle according to a seventh aspect includes a plurality of vehicle seats according to any one of the first to sixth aspects, the vehicle seats being arranged in the vehicle width direction.

In the disclosure according to the seventh aspect, even in a case where the vehicle seats are arranged in the vehicle width direction, it is possible to avoid the seatbacks adjacent to each other from interfering with each other at the time when the seat cushion rotates.

As described above, with the present disclosure, it is possible to rotate the seat cushion by reducing the angle of the seatback with a simple and inexpensive configuration.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The following describes an embodiment of the present disclosure in detail with reference to the drawings. Note that, for convenience of description, in each of the drawings, an arrow UP indicates the upper direction of a vehicle and a vehicle seat, an arrow FR indicates the front direction of the vehicle and the vehicle seat, and an arrow RH indicates the right direction of the vehicle and the vehicle seat. Accordingly, in the following description, in a case where the upper and lower sides, the front and rear sides, and the right and left sides are described without any special description, they respectively indicate the upper and lower sides in the up-down direction in the vehicle and the vehicle seat, the front and rear sides in the front-rear direction in the vehicle and the vehicle seat, and the right and left sides in the right-left direction (the vehicle width direction and the seat width direction) in the vehicle and the vehicle seat.

Figure 1:
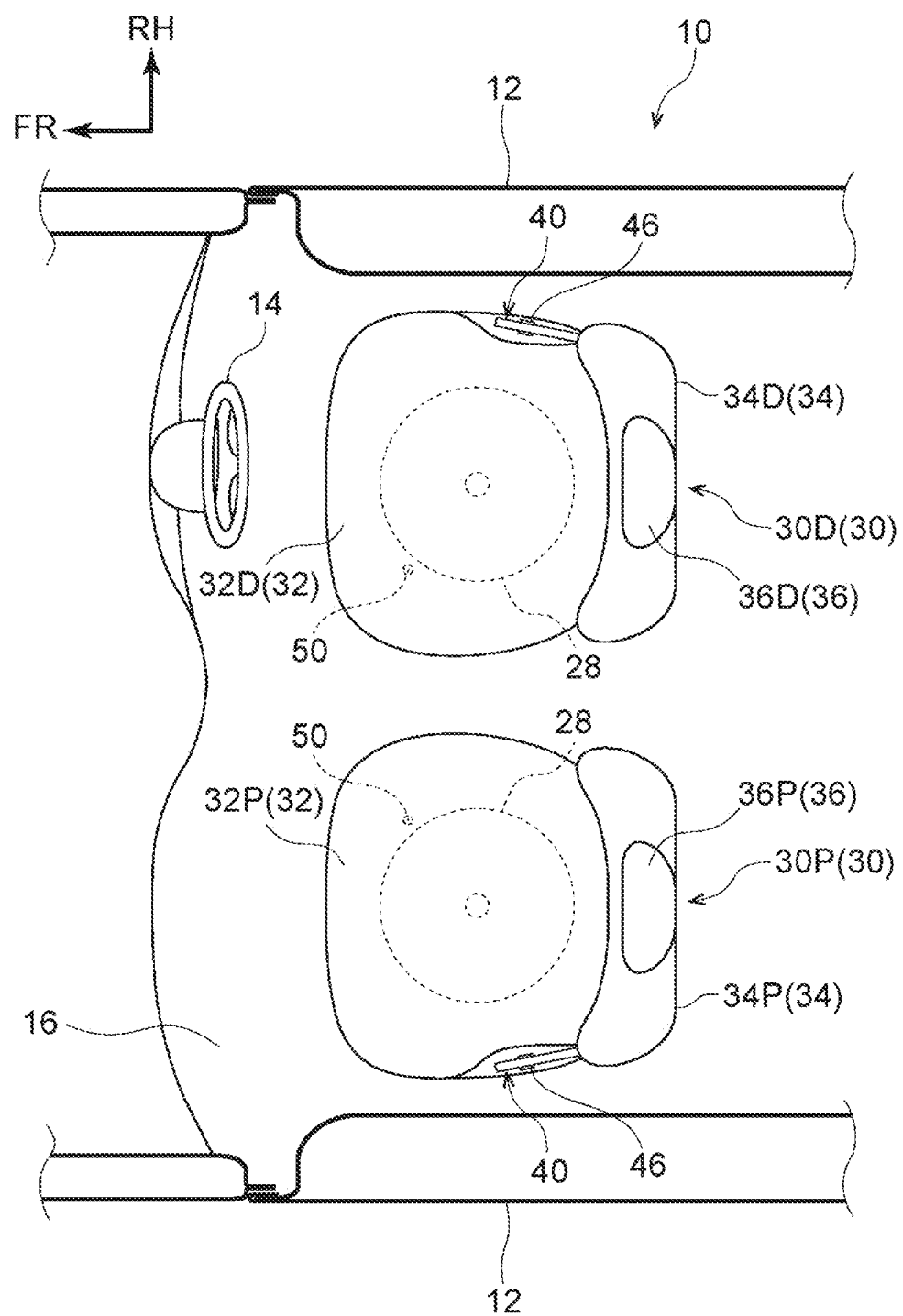
FIG. 1 is a plan view illustrating a vehicle including a vehicle seat according to the present embodiment.

As illustrated in FIG. 1, a front seat of a vehicle 10 according to the present embodiment is provided with a pair of right and left vehicle seats (hereinafter just referred to as the "seats") 30. Note that the vehicle 10 is a light automobile (with a steering wheel on the right side) in which a steering wheel 14 is provided on the right side, as an example. On this account, a console box and the like may not be provided between the right and left seats 30, and the right and left seats 30 may be placed to be close to each other.

Further, the following description may be made with the seat 30 on the driver side being referred to as a "seat 30D" and the seat 30 on the passenger side being referred to as a "seat 30R" Further, the right and left seats 30 are symmetrical in the right-left direction and have an equivalent configuration. Accordingly, the following description may be made with the seat 30D on the driver side (the right side) being taken as an example.

Figure 2:
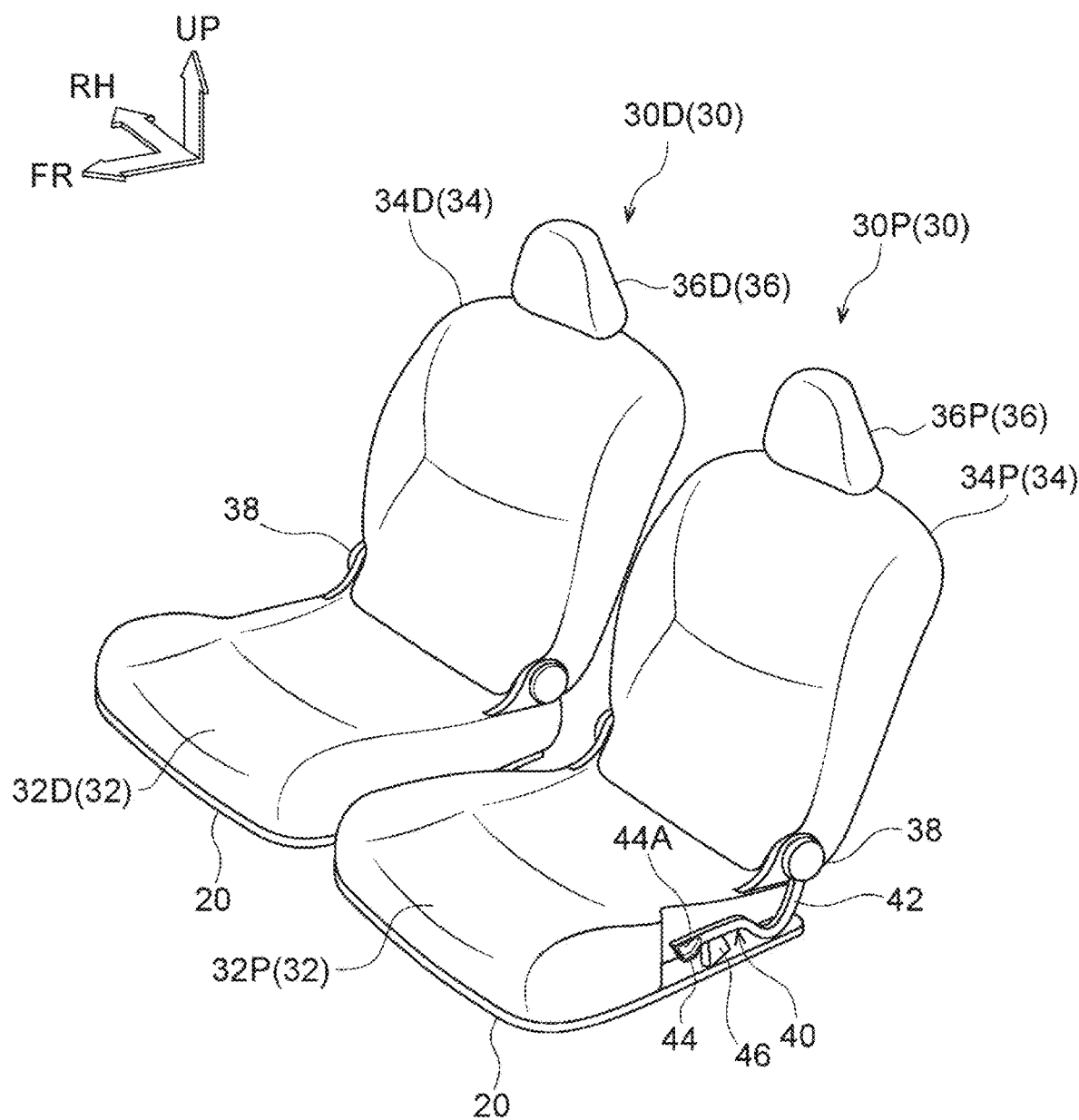
FIG. 2 is a perspective view illustrating the vehicle seat according to the present embodiment.

As illustrated in FIGS. 1, 2, the seat 30 includes a seat cushion 32 on which an occupant (not shown) sits (the legs and the bottom of the occupant are supported by the seat cushion 32), a seatback 34 configured to support the back of the occupant, and a headrest 36 configured to support the head of the occupant. The seat 30 includes a flat-shaped rotatable plate 28 formed in a round shape in a plan view such that the rotatable plate 28 is placed on a lower part of the seat cushion 32.

Figure 3:
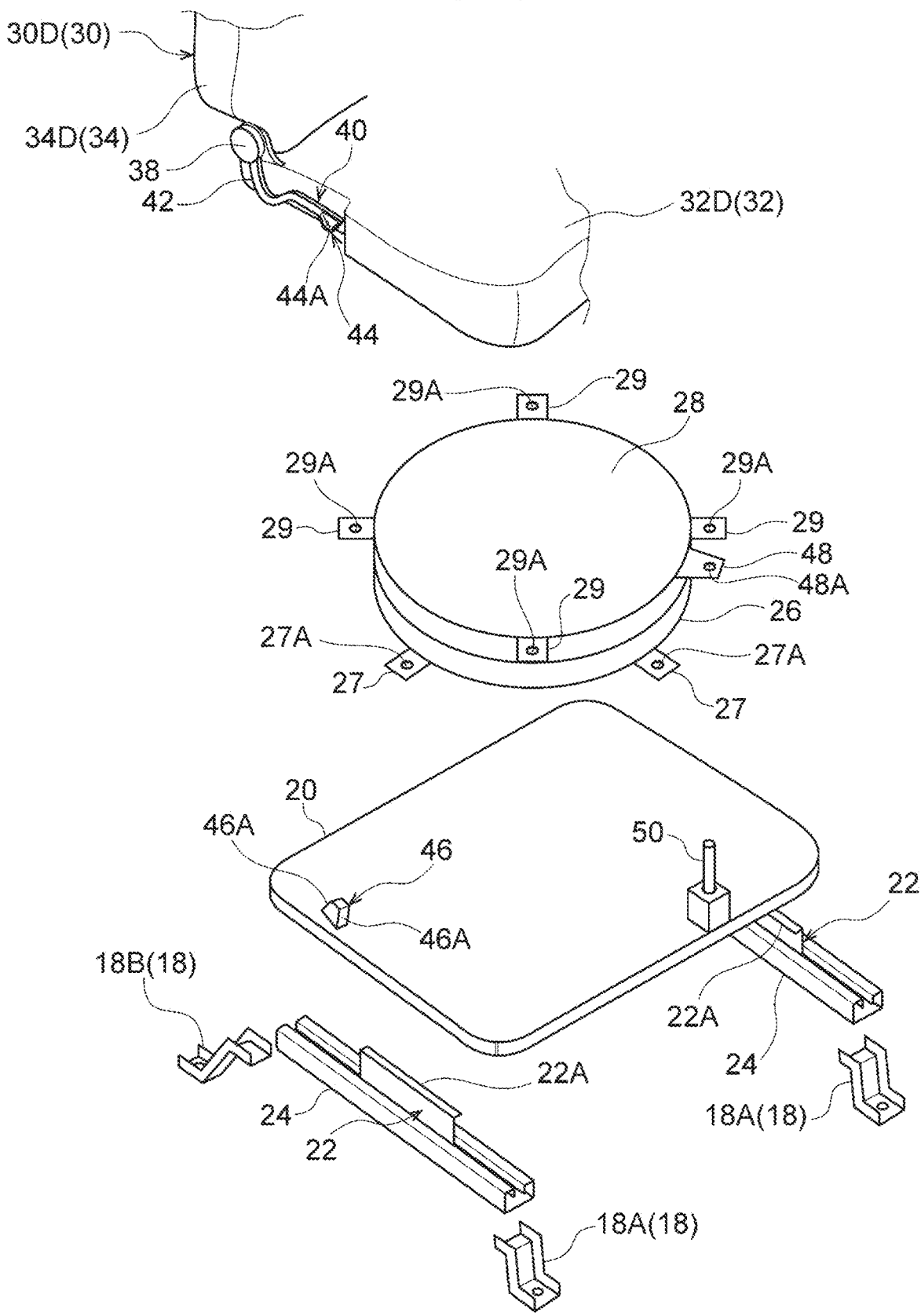
FIG. 3 is an exploded perspective view of the vehicle seat according to the present embodiment.

As illustrated in FIG. 3, on an outer peripheral portion of the rotatable plate 28, four flat-shaped brackets 29 projecting outwardly in the radial direction of the rotatable plate 28 are provided at regular intervals in an integrated manner. Respective through-holes 29A are formed in the brackets 29. Accordingly, the rotatable plate 28 is provided in an integrally fixed state on the lower part of the seat cushion 32 such that fixing screws (not shown) are passed through the through-holes 29A from the lower side and engaged threadedly with female screw portions (not shown) formed in the lower part of the seat cushion 32.

The rotatable plate 28 is supported by a flat-shaped support plate 26 so as to be rotatable around an axial direction that is along the up-down direction. The support plate 26 is formed in a round shape having the same diameter as the rotatable plate 28 in a plan view. The support plate 26 is placed on the lower side of the rotatable plate 28 in an overlapping manner so as to be coaxial with the rotatable plate 28. When the rotatable plate 28 rotates relative to the support plate 26, the seat 30 takes at least a driving-time position (see FIG. 1) facing forward and a boarding-alighting-time position (see FIG. 7) facing a doorway side that is opened and closed by a front side door 12 (see FIG. 1).

As illustrated in FIG. 3, on an outer peripheral portion of the support plate 26, four flat-shaped brackets 27 projecting outwardly in the radial direction of the support plate 26 are provided at regular intervals in an integrated manner. Respective through-holes 27A are formed in the brackets 27. Accordingly, the support plate 26 is provided in an integrally fixed state on a top face of a lower panel 20 serving as a support member such that fixing screws (not shown) are passed through the through-holes 27A from the upper side and engaged threadedly with female screw portions (not shown) formed in the lower panel 20.

Figure 5:
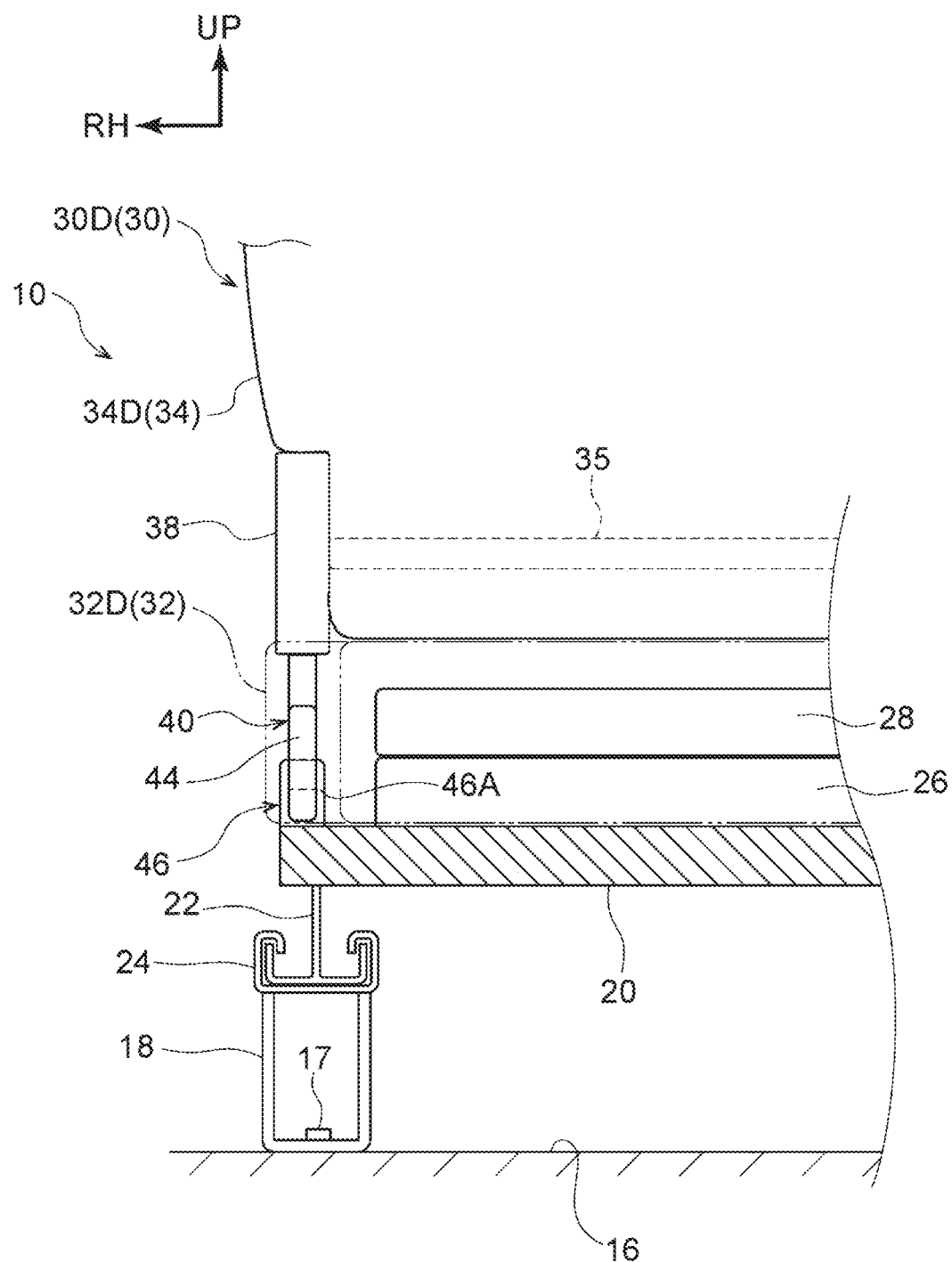
FIG. 5 is a front view partially illustrating an essential part of the vehicle seat according to the present embodiment in a cutaway manner.

The lower panel 20 is formed in a generally rectangular flat-plate shape larger than the support plate 26 in a plan view. As illustrated in FIG. 5, respective leg portions 22 having a generally reversed "T" shaped section are attached to bottom faces of opposite end parts of the lower panel 20 in the seat width direction. As illustrated in FIG. 3, the leg portion 22 is formed in a generally rectangular flat-plate shape configured such that the length in the front-rear direction is longer than the length in the up-down direction. An upper end part of the leg portion 22 serves as a flange portion 22A bent inwardly in the seat width direction. The flange portion 22A is attached to the bottom face of the lower panel 20.

Further, as illustrated in FIGS. 3, 5, a pair of right and left slide rails 24 is provided to extend in the front-rear direction, and the leg portions 22 are slidably supported by the right and left slide rails 24, respectively. The slide rail 24 is formed to have a generally "U" shaped section. A pair of front and rear legs 18 is provided to be fixed to a floor panel 16 of the vehicle 10, and a front end part and a rear end part of the slide rail 24 are supported by the front and rear legs 18, respectively.

The legs 18 have a generally "Z" shape in a side view and are formed symmetrically in the front-rear direction. The legs 18 are screwed, by respective fixing screws 17, into respective predetermined positions on the floor panel 16 that are separated from each other in the front-rear direction. The slide rail 24 is supported such that the front end part and the rear end portion of the slide rail 24 are attached to respective top faces of a front leg 18A and a rear leg 18B.

With such a configuration, the seat 30 is slidable in the front-rear direction along the slide rails 24. Although detailed descriptions are omitted herein, the leg portion 22 is configured to be fixable to the slide rail 24 at a plurality of positions so that the position of the seat 30 is adjustable.

Further, as illustrated in FIG. 3, a flat-shaped lock plate 48 projecting outwardly in the radial direction of the rotatable plate 28 is provided integrally with the outer peripheral portion of the rotatable plate 28, and a through-hole 48A is formed in the lock plate 48. The lower panel 20 is provided with a columnar lock pin 50 configured such that, when a select lever (not shown) is set to a range other than a parking range, the lock pin 50 projects upward, and when the select lever is set to the parking range, the lock pin 50 retracts downward.

In other words, the lock pin 50 is configured to move from a raised position to a lowered position by a well-known electrical linkage mechanism only when the select lever is set to the parking range. When the lock pin 50 projects upward (moves up), the lock pin 50 is inserted into the through-hole 48A of the lock plate 48. That is, the lock pin 50 is configured to lock the seat 30 non-rotatably (such that the rotatable plate 28 does not rotate relative to the support plate 26) when the lock pin 50 is inserted into the through-hole 48A of the lock plate 48.

When the lock pin 50 retracts downward (moves down), the lock pin 50 is removed from the through-hole 48A of the lock plate 48. That is, the lock pin 50 is configured to allow the seat 30 to rotate (such that the seat 30 is unlocked so that the rotatable plate 28 is rotatable relative to the support plate 26) when the lock pin 50 is removed from the through-hole 48A of the lock plate 48. Note that a locking mechanism is constituted by the lock pin 50 and the lock plate 48.

Further, as illustrated in FIG. 5, a connecting rod 35 the axial direction of which is along the seat width direction is provided inside a lower end part of the seatback 34, and the seatback 34 can turn around the connecting rod 35 as a rotating shaft. A well-known angle adjustment mechanism 38 configured to adjust the angle of the seatback 34 relative to the seat cushion 32 is provided on a first end side of the connecting rod 35 (the seatback 34) in the seat width direction (on the outer side in the vehicle width direction).

Figure 4:
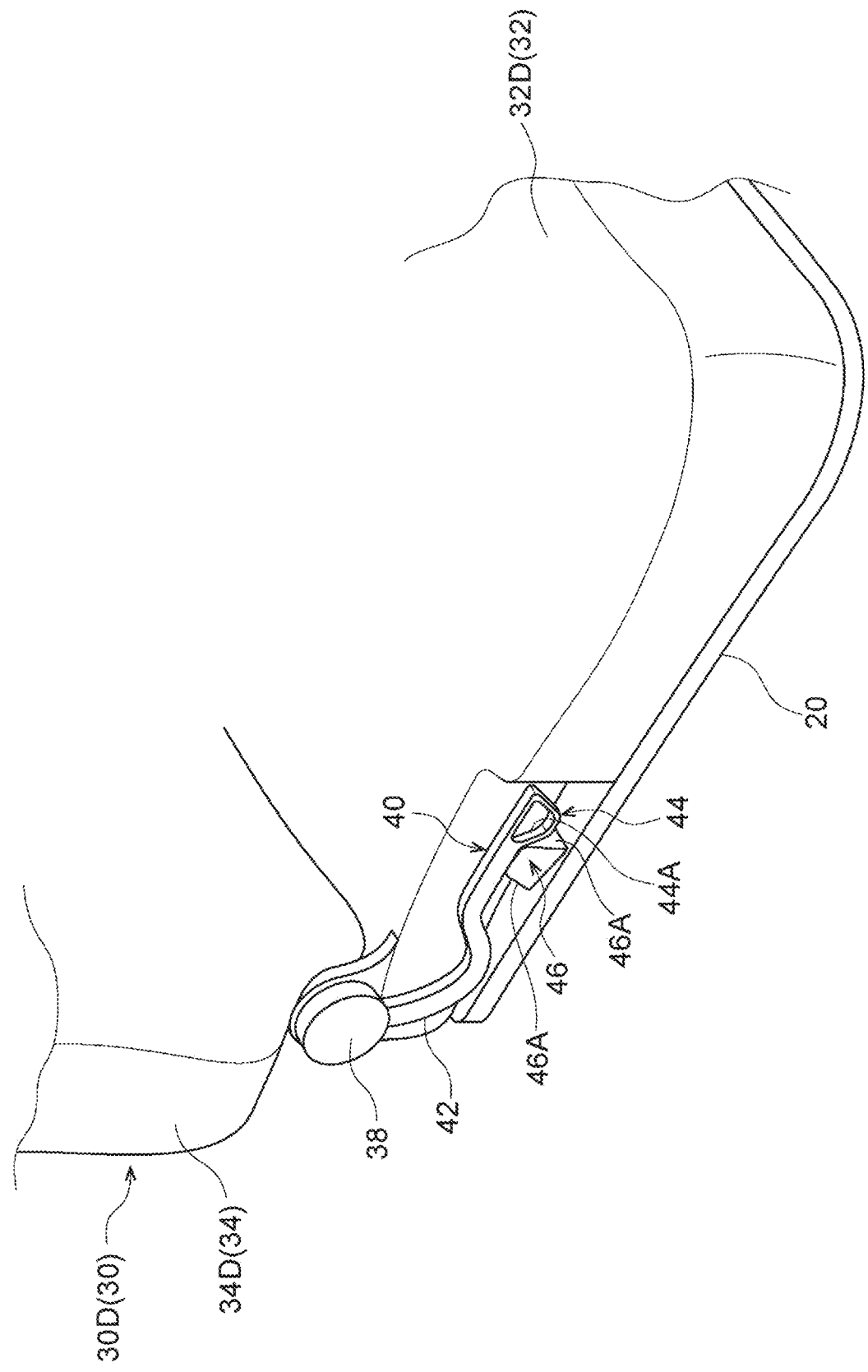
FIG. 4 is a perspective view illustrating an essential part of the vehicle seat according to the present embodiment in an enlarged manner.

As illustrated in FIGS. 3 to 5, a reclining lever 40 as an operated member configured to unlock and lock the angle adjustment mechanism 38 is placed on a first end side of the seat cushion 32 in the seat width direction (on the outer side in the vehicle width direction). The reclining lever 40 is formed in a flat-plate shape the longitudinal direction of which is along the front-rear direction, and a base portion 42 that is a rear end part of the reclining lever 40 is connected to the angle adjustment mechanism 38 such that the base portion 42 is turnable around an axial direction that is along the seat width direction.

Further, a part to which the base portion 42 is connected in a turnable manner is provided with a biasing member (not shown) such as a torsion spring, and the reclining lever 40 is biased such that a gripper 44 that is a front end part of the reclining lever 40 is always directed downward. That is, the angle adjustment mechanism 38 is configured to be locked when the gripper 44 of the reclining lever 40 is turned downward and to be unlocked when the gripper 44 of the reclining lever 40 is pulled (turned) upward against the biasing force of the biasing member.

The seatback 34 is biased by a biasing member (not shown) such as a torsion spring provided in the connecting rod 35, for example, such that the seatback 34 is tilted forward in the seat front-rear direction when the angle adjustment mechanism 38 is unlocked. Accordingly, an occupant can lock the seatback 34 at a desired position (angle) such that, after the occupant pulls up the gripper 44 of the reclining lever 40, the occupant tilts the seatback 34 rearward to the desired position by himself or herself (manually) and releases (turns downward) the gripper 44 of the reclining lever 40.

Note that the gripper 44 of the reclining lever 40 is formed to have a wide width in the up-down direction such that the gripper 44 overhangs downward in a side view. The gripper 44 has a hole portion 44A formed such that an occupant sitting on the seat cushion 32 can insert his or her finger into the hole portion 44A so that the occupant can easily operate the gripper 44 of the reclining lever 40.

Further, as illustrated in FIGS. 3 to 5, a projection portion 46 is provided on a first end side of the lower panel 20 in the seat width direction (on the outer side in the vehicle width direction). The projection portion 46 is provided as an operating member having a plate thickness that is equal to or more than the plate thickness of the reclining lever 40 and projecting upward by a predetermined height, the operating member being configured to relatively operate the reclining lever 40.

The projection portion 46 is formed in a generally isosceles trapezoidal shape having inclined surfaces 46A at a predetermined angle in a side view. The projection portion 46 is configured to unlock the angle adjustment mechanism 38 by relatively pushing up the gripper 44 of the reclining lever 40 moving rearward along with a rotation of the seat cushion 32 toward the outer side in the vehicle width direction. Accordingly, the projection portion 46 is placed on a movement locus of the reclining lever 40 along with the rotation of the seat cushion 32 in a plan view on the lower panel 20.

Figure 6A:
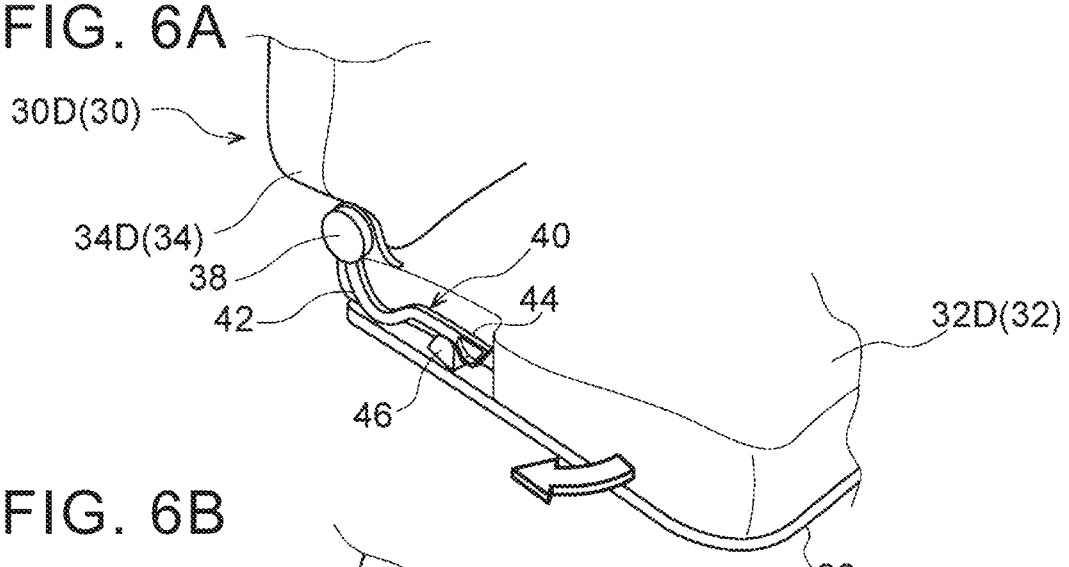
FIG. 6A is a perspective view illustrating a step of tilting a seatback forward in the seat front-rear direction along with a rotation of a seat cushion.
Figure 6B:
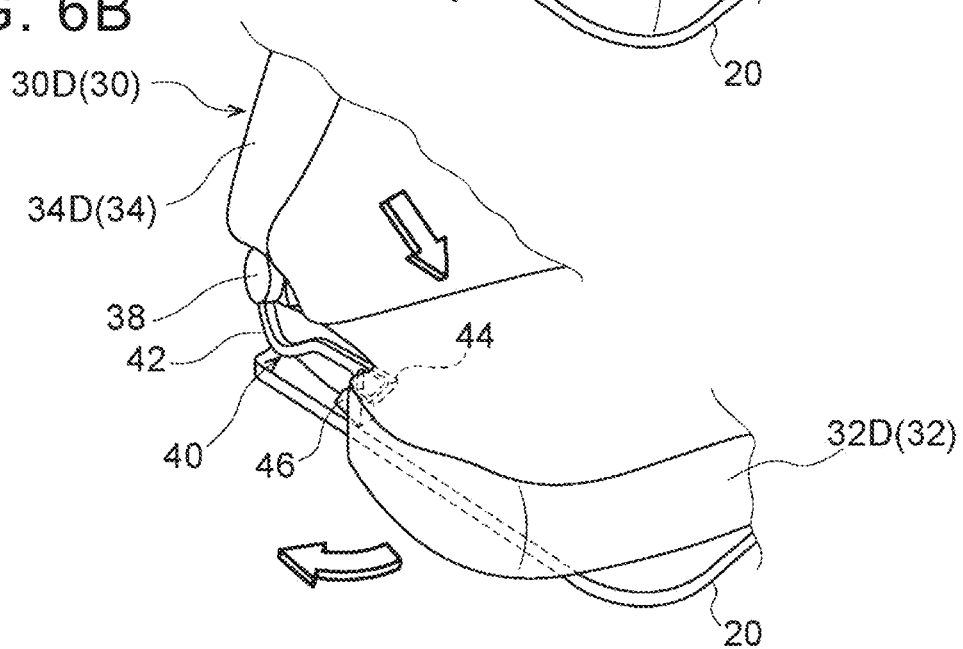
FIG. 6B is a perspective view illustrating the step of tilting the seatback forward in the seat front-rear direction along with the rotation of the seat cushion.
Figure 6C:
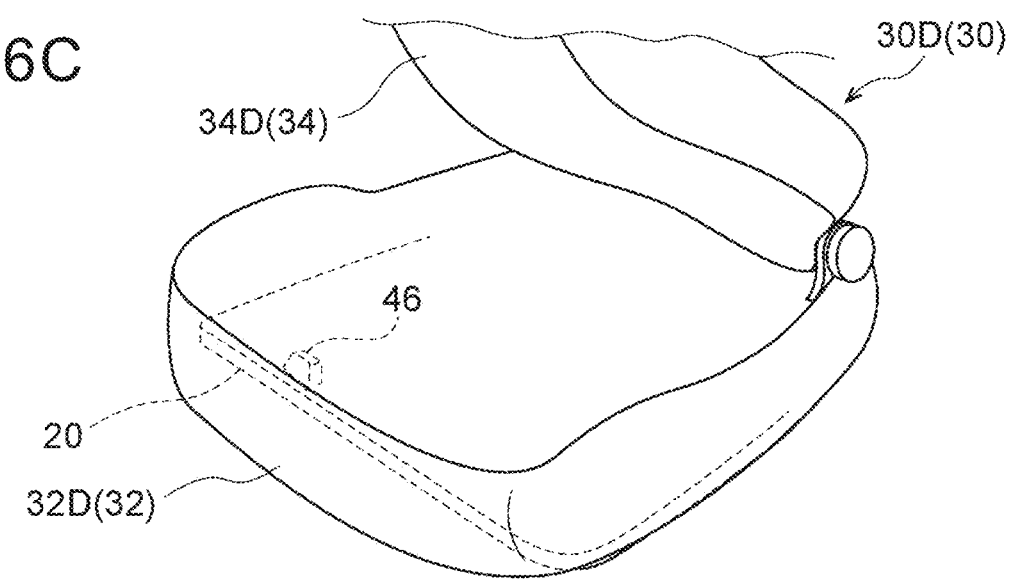
FIG. 6C is a perspective view illustrating the step of tilting the seatback forward in the seat front-rear direction along with the rotation of the seat cushion.

Further, the projection portion 46 also functions as a stopper configured to restrict a rotation of the seat cushion 32 when the seat 30 rotates to the boarding-alighting-time position facing the doorway side (see FIG. 6C). That is, a restricted portion (not shown) the position of which is restricted by the projection portion 46 (the restricted portion abuts with the projection portion 46) is formed on a bottom face of the seat cushion 32.

Next will be described an operation of the seat 30 according to the present embodiment configured as described above. Note that the seat 30 to be rotated is the seat 30D on the driver side.

When the vehicle 10 is parked and the select lever is set to the parking range by the operation of the occupant, the lock pin 50 retracts downward in conjunction with this, so that the lock pin 50 is removed from the through-hole 48A of the lock plate 48. That is, the locking mechanism locked to a seat cushion 32D is unlocked, so that the seat 30D becomes rotatable.

When the lock pin 50 that causes the seat 30D (the seat cushion 32D) to be non-rotatable is configured to be unlocked only when the select lever is set to the parking range as such, it is possible to prevent such a situation that the seat cushion 32D rotates and a seatback 34D is tilted forward in the seat front-rear direction (the seatback 34D rises generally vertically) unnecessarily in such cases that the vehicle 10 is traveling.

When the seat 30D becomes rotatable, the occupant opens the front side door 12 on the driver side and starts rotating the seat cushion 32D outwardly in the vehicle width direction by himself or herself (manually) as illustrated in FIG. 6A so that the occupant can get off the vehicle. Consequently, as illustrated in FIG. 6B, the gripper 44 of the reclining lever 40 retracting along with the rotation of the seat cushion 32D is relatively pushed up (operated) by the projection portion 46, so that the angle adjustment mechanism 38 is unlocked.

Hereby, the seatback 34D is tilted forward in the seat front-rear direction by the biasing force of the biasing member (the seatback 34D rises at least generally vertically). Accordingly, when the seat cushion 32D rotates, it is possible to avoid the seatback 34D from interfering with an obstacle in a vehicle cabin such as a seatback 34P (see FIG. 1) on the passenger side that is at the driving-time position facing forward, for example.

Particularly, in the case of the vehicle 10 such as a light automobile in which the distance, in the right-left direction, between the seat 30D on the driver side and the seat 30P on the passenger side is narrow, when the seatback 34D is tilted rearward at the time when the seat 30D on the driver side is to be rotated outwardly in the vehicle width direction, for example, the seatback 34D interferes with the seatback 34P of the seat 30P on the passenger side, so that the seat 30D cannot be rotated.

On this account, in the related art, when the seat 30D is rotated outwardly in the vehicle width direction in such a vehicle 10, the occupant should operate the gripper 44 of the reclining lever 40 each time so as to unlock the angle adjustment mechanism 38 and tilt the seatback 34D forward in the seat front-rear direction (the seatback 34D should be raised at least generally vertically). The occupant is burdened with the operation thus performed each time.

However, with the seat 30D according to the present embodiment, only by rotating the seat cushion 32D (only by rotational force of the seat cushion 32D), the angle adjustment mechanism 38 can be unlocked automatically. Accordingly, in comparison with the case where the occupant should operate the gripper 44 of the reclining lever 40 each time so as to unlock the angle adjustment mechanism 38, the burden to the occupant can be reduced.

Further, since an existing mechanism such as the reclining lever 40 is used, it is possible to rotate the seat cushion 32D by reducing the angle of the seatback 34D (by tilting the seatback 34D forward in the seat front-rear direction) with a simple and inexpensive configuration without increasing the weight of the vehicle 10.

Further, since the projection portion 46 is formed in a generally isosceles trapezoidal shape in a side view, the gripper 44 of the reclining lever 40 retracting along with the rotation of the seat cushion 32D is smoothly pushed up along the inclined surface 46A of the projection portion 46. That is, only by rotating the seat cushion 32D, the angle adjustment mechanism 38 can be unlocked smoothly.

Figure 7:
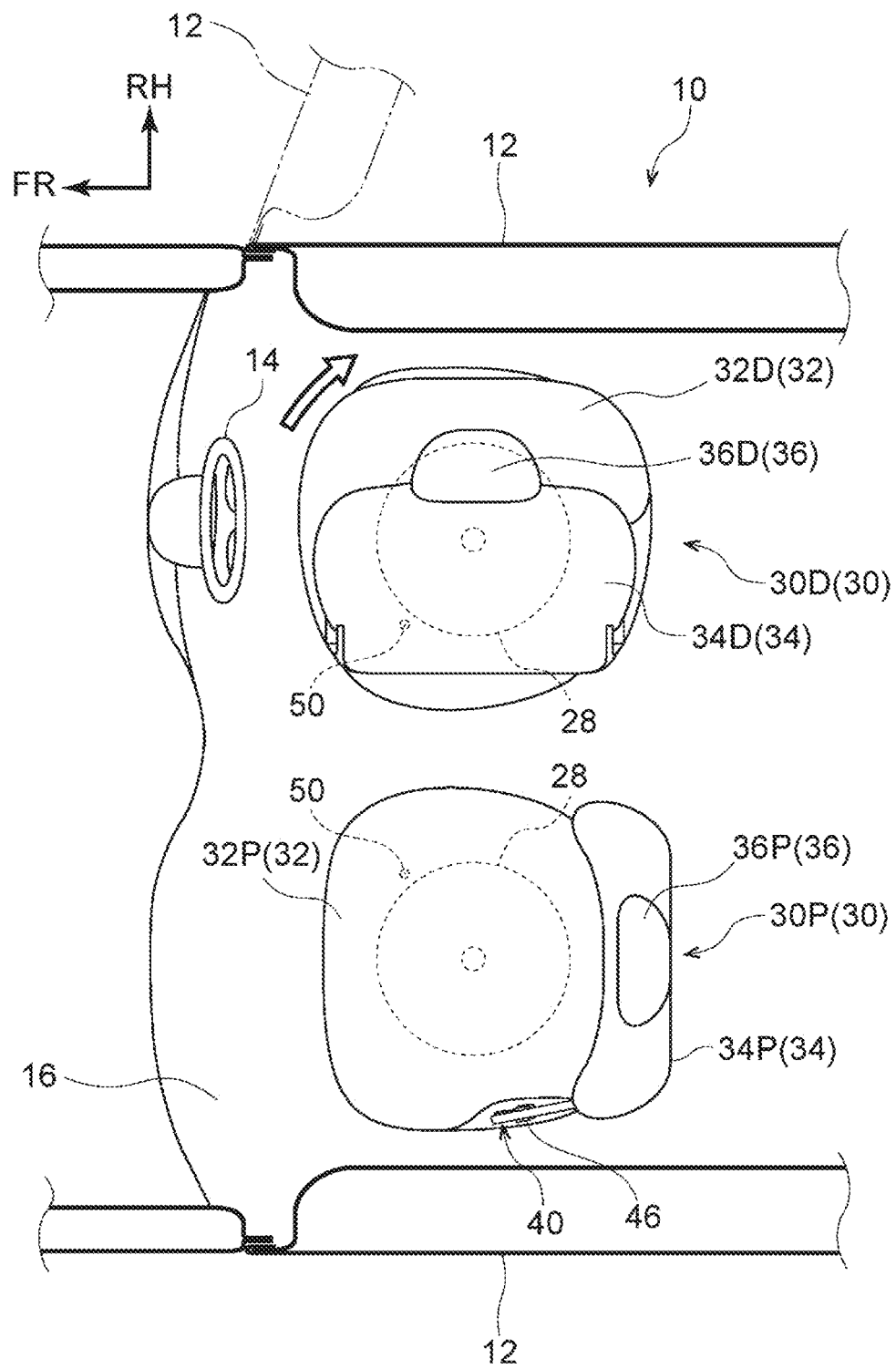
FIG. 7 is a plan view illustrating the vehicle seat according to the present embodiment, the vehicle seat rotating outwardly in the vehicle width direction.

Note that, when the seat 30D is rotated further outwardly in the vehicle width direction, the restricted portion formed on the bottom face of the seat cushion 32D abuts with the projection portion 46 as illustrated in FIG. 6C. Hereby, the rotation of the seat cushion 32D is restricted, and the seat 30D stops at the boarding-alighting-time position facing the doorway side as illustrated in FIG. 7. Thus, the occupant can get off the vehicle from the doorway smoothly and easily.

Further, when the occupant gets on the vehicle 10, the occupant sits on the seat cushion 32D facing the doorway side and rotates the seat 30D inwardly in the vehicle width direction. As a result, the gripper 44 of the reclining lever 40 moves forward along with the rotation of the seat 30D, so that the gripper 44 is pushed up smoothly by the projection portion 46 (the inclined surface 46A on the opposite side to the inclined surface 46A described above).

When the occupant tilts the seatback 34D rearward to a desired angle by himself or herself (manually) in the timing when the gripper 44 of the reclining lever 40 moves downward over the projection portion 46 by the biasing force of the biasing member, the seatback 34D can be automatically locked at the angle.

When the seat 30D is rotated to the driving-time position facing forward in the vehicle front-rear direction, the front side door 12 is closed, so that the vehicle 10 is started to travel. When the occupant sets the select lever to a range other than the parking range, the lock pin 50 projects upward so as to be inserted into the through-hole 48A of the lock plate 48. Hereby, the seat cushion 32D is locked to be non-rotatable.

The operation of the seat 30 according to the present embodiment is as described above. However, the seat 30 according to the present embodiment may be configured as follows.

That is, the seat cushion 32 is not limited to the configuration in which the seat cushion 32 is rotated by the occupant (manually), and the seat cushion 32 may be configured to rotate by electric control. In this case, the seat cushion 32 should be triggered by unlocking of the lock pin 50 (the seat cushion 32 should operate in conjunction with unlocking of the lock pin 50) such that the seat cushion 32 automatically rotates outwardly in the vehicle width direction at a predetermined speed (slowly).

With such a configuration, in comparison with the case where the seat cushion 32 is rotated manually, the burden to the occupant can be reduced, and the occupant can get off the vehicle from the doorway smoothly and easily. Accordingly, particularly, in a case of the vehicle 10 in which physically disabled people and senior people often sit on the seat 30P (a seat cushion 32P) on the passenger side, for example, it is preferable that at least the seat cushion 32P of the seat 30P be rotated by electric control.

Further, in a case where the vehicle 10 according to the present embodiment is a self-driving vehicle, the vehicle 10 may be configured such that the lock pin 50 locked to the lock plate 48 is also unlocked at the time of a self-driving mode. That is, the vehicle 10 may be configured such that the seat 30 is also rotatable during self-driving as well as when the vehicle 10 is parked (the select lever is set to the parking range).

In this case, the restricted portion the position of which is restricted by the projection portion 46 (the restricted portion that abuts with the projection portion 46) is not formed on the bottom face of the seat cushion 32. With such a configuration, the seat 30P on the passenger side and the seat 30D on the driver side can face a rear seat side (the seat 30P and the seat 30D are rotated by 180 degrees) during self-driving.

Note that, as illustrated in FIG. 7, when the seat 30D rotates by 180 degrees by passing through the outer side in the vehicle width direction, the seatback 34D can be avoided from interfering with the seatback 34P on the passenger side and also avoided from interfering with the steering wheel 14.

Further, in the configuration where the seat 30D is rotatable only in either of a case where the vehicle 10 is parked (when the select lever is set to the parking range) and a case where self-driving is being performed, it is possible to prevent such a situation that the seat cushion 32D on a driver seat rotates by mistake and the seatback 34D is tilted forward in the seat front-rear direction (the seatback 34D rises generally vertically) while the vehicle 10 is manually operated, for example.

Further, the self-driving mode may include a plurality of levels (e.g., Lv1 to Lv5), and the lock pin 50 may be configured to be unlocked from the lock plate 48 when the self-driving mode is set to a predetermined level (e.g., Lv4) or more among the levels. In other words, the seat 30D may be configured to be rotatable only in either of a case where the vehicle 10 is parked (when the select lever is set to the parking range) and a case where self-driving is being performed at the predetermined level (e.g., Lv4) or more.

With such a configuration, it is possible to prevent such a situation that the seat cushion 32D on the driver seat rotates by mistake and the seatback 34D is tilted forward in the seat front-rear direction (the seatback 34D rises generally vertically) during self-driving at a level (e.g., Lv1 to Lv3) less than the predetermined level as well as when the vehicle 10 is being manually operated.

Figure 8:
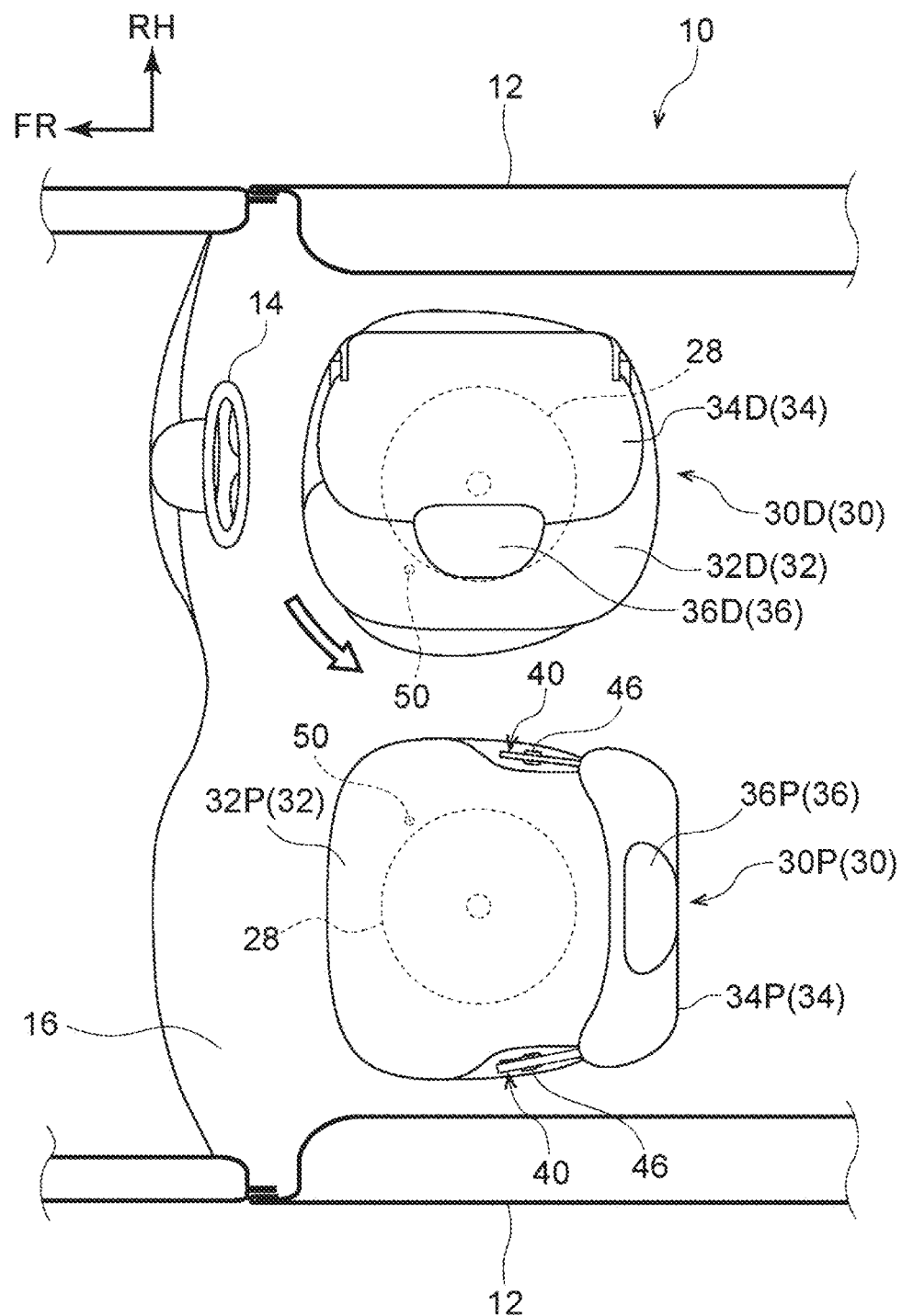
FIG. 8 is a plan view illustrating the vehicle seat according to the present embodiment, the vehicle seat rotating inwardly in the vehicle width direction.

Note that, when the seat 30D is rotated by 180 degrees, the seat 30D may be rotated inwardly in the vehicle width direction as illustrated in FIG. 8. In this case, the reclining lever 40 and the projection portion 46 are also provided on a second end side in the seat width direction (on the inner side in the vehicle width direction). Further, when the seat 30D rotates by 180 degrees by passing through the inner side in the vehicle width direction, the seatback 34D is avoided from interfering with the front side door 12 and also avoided from interfering with the steering wheel 14, similarly to the above.

The seat 30 according to the present embodiment has been described above with reference to the drawings. However, the seat 30 according to the present embodiment is not limited to those illustrated in the figures, and its design is modifiable appropriately within a range that does not deviate from the gist of the present disclosure. For example, the lock pin 50 may be configured to also retract downward (to be unlocked) when a parking brake is actuated.

Further, in a case where the seat 30 is provided in a rear seat of the vehicle 10, three seats 30 may be provided in the vehicle width direction. Even in a case where a plurality of seats 30 is arranged in the vehicle width direction as such, it is possible to avoid the seatbacks 34 adjacent to each other from interfering with each other at the time when the seat cushion 32 rotates.

What is claimed is:

1. A vehicle seat comprising:
a seat cushion supported by a support member so as to be rotatable around an axial direction along a seat up-down direction;
a seatback configured such that an angle of the seatback relative to the seat cushion is adjustable by unlocking and locking of an angle adjustment mechanism, the seatback being biased to be tilted forward in a seat front-rear direction when the angle adjustment mechanism is unlocked;
an operated member configured to unlock and lock the angle adjustment mechanism, the operated member being placed on a first end side of the seat cushion in a seat width direction; and
an operating member provided in the support member such that the operating member is placed on a first end side of the seat cushion in the seat width direction, the operating member being configured to relatively operate the operated member along with a rotation of the seat cushion so as to unlock the angle adjustment member, wherein the operating member is a projection portion on a movement locus of the operated member along with the rotation of the seat cushion in a plan view, and the operating member abuts with a restricted portion on a bottom face of the seat cushion during the rotation of the seat cushion.

2. The vehicle seat according to claim 1, wherein the seat cushion is configured to be rotatable outwardly in a vehicle width direction.

3. The vehicle seat according to claim 1, comprising a locking mechanism configured to cause the seat cushion to be non-rotatable, wherein the locking mechanism is configured to be unlocked when a select lever is set to a parking range.

4. The vehicle seat according to claim 3, wherein the locking mechanism is configured to be also unlocked when a self-driving mode is set.

5. The vehicle seat according to claim 4, wherein:
the self-driving mode includes a plurality of levels; and
the locking mechanism is configured to be unlocked when the self-driving mode is set to a predetermined level or more among the levels.

6. The vehicle seat according to claim 3, wherein the seat cushion is configured to rotate in conjunction with unlocking of the locking mechanism by electric control.

7. A vehicle comprising a plurality of vehicle seats according to claim 1, the vehicle seats being arranged in the vehicle width direction.

8. The vehicle seat according to claim 1, further comprising
a second operated member and a second operating member on a second end side of the seat cushion in the seat width direction.

* * * * *